UNITED STATES PATENT OFFICE.

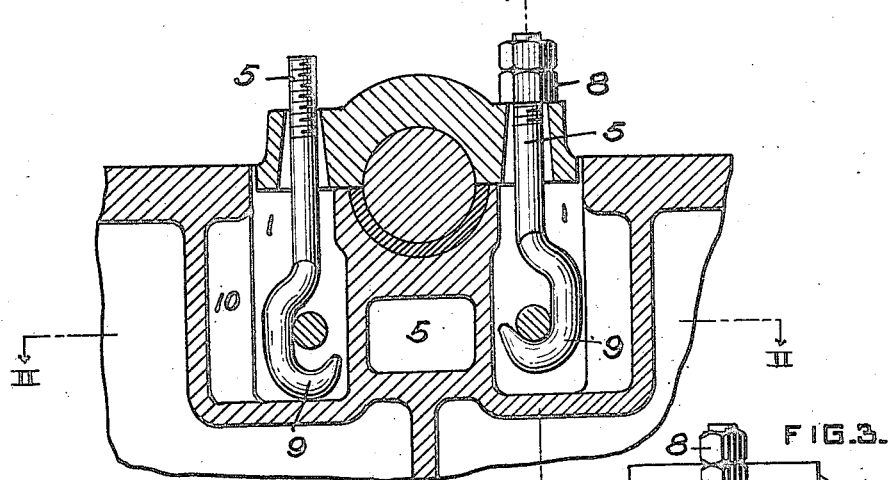
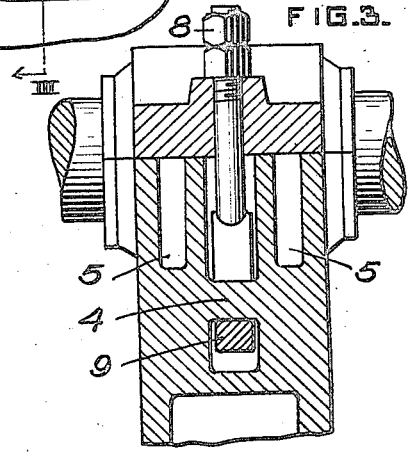
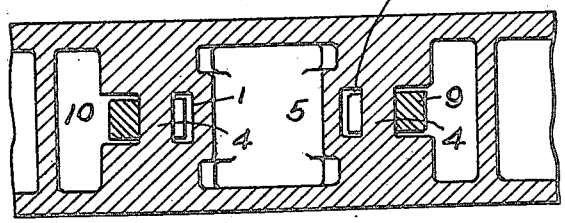
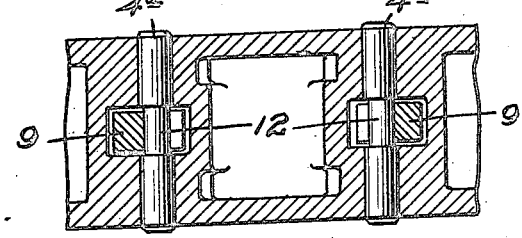

SAMUEL McMILLEN, OF PITTSBURGH, PENNSYLVANIA, ASSIGNOR TO MACKINTOSH HEMPHILL COMPANY, OF PITTSBURGH, PENNSYLVANIA, A CORPORATION OF PENNSYLVANIA.

JOURNAL BEARING.

1,419,506.

Specification of Letters Patent. Patented June 13, 1922.

Application filed May 17, 1920. Serial No. 381,881.

*To all whom it may concern:*

Be it known that I, SAMUEL MCMILLEN, residing at Pittsburgh, in the county of Allegheny and State of Pennsylvania, a citizen of the United States, have invented or discovered certain new and useful Improvements in Journal Bearings, of which improvements the following is specification.

It is the practice to secure the caps of journal bearings in large massive machinery such as rolling mills, feed tables, etc., by means of removable studs or bolts, which have heretofore been formed with T-shaped heads adapted to engage by partial rotation of the bolts, shoulders or abutments arranged in recesses on opposite sides of the fixed or stationary portion of the bearing. The opposite ends of these studs or bolts are threaded and are passed through the removable cap which is held in place by nuts screwing onto the threaded portion of the bolt. Experience has shown that unless care is taken to turn the studs or bolts so far that the heads of the T-shaped bolts pass entirely under the shoulders or abutments in the recesses, the heads are liable to work out from under the shoulder, and as the recesses in which the bolts were inserted, were in communication with the oil chambers, the movements of the bolt heads from under the shoulders were facilitated.

The invention described herein has for its object the construction and combination whereby any movement of the bolts due to the jarring of the machinery will be prevented, and it is a further object of the invention to prevent any flow of lubricant into the recesses into which the bolts project. The invention is hereinafter more fully described and claimed.

In the accompanying drawing forming a part of this specification, Fig. 1 is a sectional elevation of a portion of a feed table of a rolling mill showing the cap of a bearing for a roller secured by the improved means described and claimed herein; Figs. 2 and 3 are sectional views on planes indicated by lines II—II and III—III, respectively in Fig. 1; Fig. 4 is a view similar to Fig. 2 illustrating a modification; Figs. 5 and 6 are sectional views on planes indicated respectively by the lines V—V and VI—VI, Fig. 4.

It will be understood that the improvement claimed herein is shown and described in connection with a bearing for a roller of a feed table for a rolling mill, that the improvement can be advantageously employed in securing caps for shafts, etc.

As shown in Figs. 1, 2, 4 and 5, recesses or pockets 1 are formed in the casting in which is formed the main or fixed portion 2 of the bearing for the journal 3, said pockets or recesses being formed on opposite sides of the bearing. Within the pockets or recesses are arranged abutments 4 for engagement with the studs or bolts 5. These abutments which are arranged transverse of the pockets may be made of any desired shape in cross-section but preferably cylindrical and may be made integral with the walls of the pockets as shown in Figs. 1, 2, and 3, or may be made in the form of pins 4ª and passed through openings in the side walls of the pockets as shown in Fig. 4. When, as is generally the case in feed tables for rolling mills, a chamber 5 is provided for the reception of a lubricant which is carried up onto the journal by collars 6, care should be taken that the pockets do not communicate with the oil chamber.

The studs or bolts 5 have their outer ends threaded for the reception of the holding nuts 8, while the opposite ends are hook shaped to engage the abutments in the pockets or recesses 1. When the abutments are made integral with the walls of the pockets 1 or otherwise non-removable, and the studs or bolts are provided with hooks 9 and the pockets are widened laterally on one side of the abutments as shown at 10, to permit of the hooked portions being passed down below the abutments. (See Figs. 1, 2 and 3). When employing removable abutments or pins suitable means are employed for preventing the accidental displacement of the pins. A suitable construction to that end consists preferably in grooving the pins as at 12 for the reception of the edges of the hook.

I claim herein as my invention:

1. The combination of a half bearing for a journal, having open-topped recesses or pockets on opposite sides of the half bearing, abutments arranged transverse of and extending across said pockets, studs or bolts having hooks to engage said abutments, and a cap having the other half of the bearing formed therein, and means engaging the studs or bolts for holding the cap in position.

2. A body of metal having a half bearing for a journal formed therein and provided with open-topped pockets or recesses in opposite sides of the half bearing and with an oil chamber intermediate but separated from the pockets, abutments arranged transversely of the pockets, studs or bolts having hooks adapted to detachably engage the abutments, a cap having the other half of the bearing formed therein, and means engaging the studs or bolts for holding the caps in position.

3. A body of metal having a half bearing for a journal formed therein and provided with pockets or recesses on opposite sides of the half bearing, studs or bolts extending into the pockets, the portions of the bolts in the pockets being provided with eyes, removable pins passing through openings in the walls of the pockets and the hooks of the bolts, a cap having the other half of the bearing formed therein, and means engaging the studs or bolts for holding the caps in position.

4. A body of metal having a half bearing for a journal formed therein and provided with pockets or recesses on opposite sides of the half bearing, studs or bolts having hooks at their ends, removable pins passing through openings in the side walls of the pockets and the hooks of the bolts, said pins being grooved for the reception of the inner edges of the hooks on the bolts, a cap having the other half of the bearing formed therein, and means engaging the studs or bolts for holding the cap in position.

In testimony whereof, I have hereunto set my hand.

SAMUEL McMILLEN.